(12) United States Patent
Vogh, Jr.

(10) Patent No.: US 7,830,514 B2
(45) Date of Patent: Nov. 9, 2010

(54) COLOR MEASUREMENT SYSTEMS AND METHODS ADDRESSING EFFECTS OF ULTRA-VIOLET LIGHT

(75) Inventor: James William Vogh, Jr., Methuen, MA (US)

(73) Assignee: X-Rite, Inc., Grand Rapids, MI (US)

( * ) Notice: Subject to any disclaimer, the term of this patent is extended or adjusted under 35 U.S.C. 154(b) by 233 days.

(21) Appl. No.: 11/873,112

(22) Filed: Oct. 16, 2007

(65) Prior Publication Data

US 2009/0097028 A1 Apr. 16, 2009

(51) Int. Cl.
G01J 3/46 (2006.01)
(52) U.S. Cl. .................................. 356/402; 356/421
(58) Field of Classification Search ................. 356/402, 356/421–425
See application file for complete search history.

(56) References Cited

U.S. PATENT DOCUMENTS

| | | | |
|---|---|---|---|
| 6,844,931 B2 | 1/2005 | Ehbets | |
| 2005/0219305 A1 | 10/2005 | Kikuchi et al. | |
| 2006/0132777 A1 | 6/2006 | Hubble, III et al. | |
| 2007/0086009 A1 | 4/2007 | Ehbets | |

FOREIGN PATENT DOCUMENTS

| | | |
|---|---|---|
| EP | 0769869 | 4/1997 |
| JP | 09 172551 | 6/1997 |

OTHER PUBLICATIONS

Extended European Search Report dated Feb. 24, 2009.

*Primary Examiner*—F. L Evans
(74) *Attorney, Agent, or Firm*—McCarter & English, LLP

(57) ABSTRACT

Systems and methods are provided to address the potential impact of lighting conditions/light sources on color measurement and/or color matching, particularly as such light variation relates to UV levels. The systems and methods generally include a UV visualizer that is adapted to establish and/or compare UV profiles for individual substrates/samples, e.g., print materials, under various illuminating conditions. According to the disclosure, it is possible to determine both (i) how a sample (e.g., a printing material) responds to UV light, and (ii) the amount of UV light under which the sample is viewed without the need to measure the excitation pattern of the sample/paper or the spectra of the illuminating light. In this way, a true color reading and/or color match may be achieved. Color corrections may be implemented that necessarily address the level of color brightener, if any, in the substrate or paper to be printed upon.

18 Claims, 11 Drawing Sheets

COLOR MEASUREMENT SYSTEMS AND METHODS ADDRESSING EFFECTS OF ULTRA-VIOLET LIGHT

FIELD OF THE INVENTION

This invention relates to systems and methods for making color measurements on materials presenting different visual characteristics when exposed to ultra-violet light, e.g., in uncertain ambient conditions.

BACKGROUND OF THE INVENTION

Materials are known to present different color characteristics when exposed to a spectrum of ambient light, including ultra-violet (UV) light. Commonly used printing materials, such as paper, present elevated effects in terms of differences in color presentation and/or perception when exposed to UV light, at least in part due to fluorescence brighteners introduced into the paper during the manufacturing process.

Optical brighteners typically absorb light in the UV wavelength range of 320 to 410 nm and re-emit fluorescence light in the visual blue spectral range between 420 to 550 nm. The maximum of the fluorescence spectrum lies between 430 and 440 nm. The reflection of the fluorescence light in the visual blue range impacts human's color perception for purposes of color printed on paper, particularly paper with brighteners involved. The effect of brighteners in printing materials also varies largely from one product to another.

On the other hand, the UV component of lighting varies widely in the day-to-day ambient environment. For example, viewing conditions vary widely for outdoor environments, indoor environments, under different weather conditions, and based on different lighting conditions/light sources. Together, such variables create endless possibilities as to how much UV light is presented to a particular substrate, e.g., paper/printing material.

The combination of the above factors leads to non-linear behavior of how a printing material presents color characteristics when exposed to different lighting. As a result, problems are created for color reading, color measurement and color matching when fluorescing elements are present, e.g., in printing materials. Many manufacturers introduce "blockers" in the printing paper in an effort to block or dampen the abnormal spectral 'blue' behavior. The introduction of blockers has also resulted in high demands and introduced significant challenges with respect to color measurement technology.

In addition, UV light is not easily characterized by technologies and instruments in the moderate price range, since light wavelengths of below 350 nm need to be accurately detected and characterized.

In terms of currently available technologies, color measurements may be made with the so called "bi-spectral" measurement method. A bi-spectral measurement device generally includes a monochromatic in the illumination optics and a spectral analyzer in the receiver channel, with the measurement carried out sequentially. A complete reflection spectrum is measured for each illumination wavelength and stored in the form of a matrix. The resulting reflection spectrum of the sample is determined by multiplication of the matrix with a vector which represents the spectral optical energy distribution of the demanded light type. Examples of commercially available bi-spectral measurement systems are the BFC-450 device available from Labsphere, Inc. (North Sutton, N.H.) and the CM-3800 device available from Konica Minolta Holdings, Inc. (Osaka, Japan).

Bi-spectral measurement technology is generally effective. However, the sequential measurement course required to effectuate the bi-spectral technique is time consuming. Realization and/or implementation of this measurement technology is also relatively expensive, putting it beyond the reach of most industrial applications.

With reference to the patent literature, U.S. Pat. No. 6,844,931 to Peter Ehbets describes a color measurement system with variable light emitting diode (LED) illumination and a spectral analyzer in the receiver. The LED light source consists of a multiplicity of differently colored, white and UV LEDs. The individual LEDs can be individually controlled so that the spectral illumination distribution can be electronically adapted to the desired spectrum. The determination of the spectral reflection factor of the sample is then carried out with a single measurement with the desired illumination spectrum.

U.S. Patent Publication No. 2007/0086009 A1 of Peter Ehbets et al. describes a solution for finding the response to different levels of UV by using separately controllable LEDs. For color measurement of samples printed on a substrate including a brightener, a raw spectral reflection factor of the sample is measured in a first measurement by illumination of the sample with light without UV portion. In a second measurement, a fluorescence spectrum of the sample is measured by illumination of the sample with only UV light. The measured fluorescence spectrum is recalculated as a corrected fluorescence spectrum by weighting with spectrally dependent correction factors and, finally, the measured raw spectral reflection factor and the corrected fluorescence spectrum are added to form a corrected spectral reflection factor from which the values characterizing the color of the sample are then calculated. The spectral correction factors are determined during the device manufacture for a certain set of light types and stored in the device. [See FIG. 2 herein for schematic illustration.]

The color measurement instrument/technology described in the Ehbets '009 publication has certain limitations. In particular, such design does not solve the problem of determining and/or addressing how much UV light is present in the light source with which a substrate/printing material is being viewed.

Challenges encountered in color reading, color measurement and/or color matching are illustrated by the following example. In particular, as demonstrated in FIG. 1, two patches that match under one light may not match under another light because of fluorescence. To illustrate this point, a physical patch #1 may be printed on paper with paper brightener. The measured reflectance of patch #1 is shown in the top left portion of FIG. 1 when illuminated by Light #1 that includes no UV light.

A second physical patch—patch #2—is printed on paper without paper brightener. The measured reflectance of patch #2 when illuminated by Light #1 (no UV light) is shown in the top right portion of FIG. 1.

The colors of patch #1 and patch #2 are the same when converted to the colorimetric XYZ color space. In addition, a human observer would not be able to discern a significant color difference between the two patches when illuminated with Light #1.

With further reference to FIG. 1, the lower portion of such figure provides color measurement data for the same physical color patches, but viewed under a light source that includes UV light. Thus, reflectance data for patch #1 and patch #2 are measured with UV-included illumination are provided in the lower portion of FIG. 1. So measured, the color patches are not the same when converted to the calorimetric XYZ color space. In addition and in contrast to the patches when illuminated with a light source that omits UV light, a human observer would be able to discern a significant color difference between the two patches.

The color-related issues illustrated with reference to FIG. 1 arise in many contexts. Thus, for example, color-related issues arise when printing onto paper that includes paper brightener(s) that fluoresce in response to UV light. This fluorescence changes the perceived color of the paper and much of what is printed on the paper. Thus, it may be unknown how a printed color will appear under a particular light source.

The interplay between optical brightener, paper and UV wavelength is illustrated in FIG. 3. With reference to the upper plot of FIG. 3, optical brightener efficiency as a function of wavelength is shown for three different types of paper. Paper #1 responds to wavelengths from 300 nm to 420 nm. Paper #3 only responds to wavelengths between 380 nm and 420 nm. With reference to the lower plot of FIG. 3, the properties of two different light sources are shown. Light source #1 peaks at around 320 nm, whereas light source #2 falls off gradually from 420 nm.

Based on the two plots of FIG. 3, it is apparent that (i) Paper #1 will be excited by both light sources, (ii) Paper #2 will be excited by both light sources, but much more by light #2, and (iii) Paper #3 will not be excited by light source #1, but will be excited by light source #2. As is readily apparent from the foregoing illustration, measuring colors with one UV light source will not capture the entire pattern of excitation. In addition, measurement of the UV level of a light source alone is also insufficient.

It is an object of the present invention to provide systems and methods for improving the precision of color measurement and color matching, particularly in view of the potential for different light sources and/or lighting conditions having varying levels of UV light. It is a further object of the present invention to provide systems and methods that may be simply, reliably and cost efficiently implemented relative to known color measurement and/or color matching processes.

These and other objects are satisfied by the systems and methods disclosed herein.

SUMMARY OF THE INVENTION

The present invention provides advantageous systems and methods for enhancing color measurement and/or color matching that effectively address the potential impact of different light sources and/or lighting conditions having varying levels of UV light. Different lighting conditions can have significant impacts on color measurements and/or color perception, e.g., when a paper includes color brightener(s) that are responsive to UV light. According to exemplary embodiments of the present disclosure, a UV visualizer is provided that is adapted to establish and/or compare UV profiles or UV visualizer charts for samples/substrates. For example, UV visualizer charts can be established for individual print materials under various illuminating conditions, e.g., illuminating conditions characterized (at least in part) by different UV levels. The individual print materials may have differing levels of color brightener(s) and the level of color brightener in a particular print material may be unknown.

The disclosed "UV profile" or "UV visualizer chart" is generally a function of various parameters, e.g., ink, media (e.g., paper) and illuminant. However, ink dependency can generally be ignored and the UV profile can be used for different ink sets. For optically brightened press sheets, users may either print a UV visualizer via a second press run, or by printing press media using an inkjet or other device. UV correction may be applied to a paper-specific basis. In particular, the disclosed UV visualizer and associated technique will help determine and address the visual bias of the paper outside of the spectral measurement.

Once a media is characterized for use with a given light source, it can be UV-corrected when used with any print technology (e.g., the same correction would be effective with respect to an Epson printer, an HP printer, etc.). UV correction is dependent on the UV character of the media and lighting. Once characterized, the UV profile is generally useful for both the target UV lighting condition and with other similarly behaved illuminants. In other words, a media that is characterized in a specific light booth may be corrected based on the disclosed UV profile in other similar light booths.

Additional features, functions and benefits of the disclosed systems and methods will be apparent from the detailed description which follows, particularly when read in conjunction with the accompanying figures.

BRIEF DESCRIPTION OF THE DRAWINGS

To assist those of skill in the art in making and using the disclosed systems and methods, reference is made to the accompanying figures, wherein.

DETAILED DESCRIPTION OF EXEMPLARY EMBODIMENT(S)

The systems and methods disclosed herein are designed to address the potential impact of lighting conditions/light sources on color measurement and/or color matching, particularly as such light variation relates to UV levels. Exemplary embodiments of the present disclosure include a UV visualizer that is adapted to establish and/or compare UV profiles for individual substrates/samples, e.g., print materials, under various illuminating conditions. The systems and methods of the present disclosure are advantageously adapted to determine both (i) how a sample (e.g., a printing material) responds to UV light, and (ii) the amount of UV light under which the sample is viewed without the need to measure the excitation pattern of the sample/paper or the spectra of the illuminating light. In this way, a true color reading and/or color match may be achieved.

Figure 1:
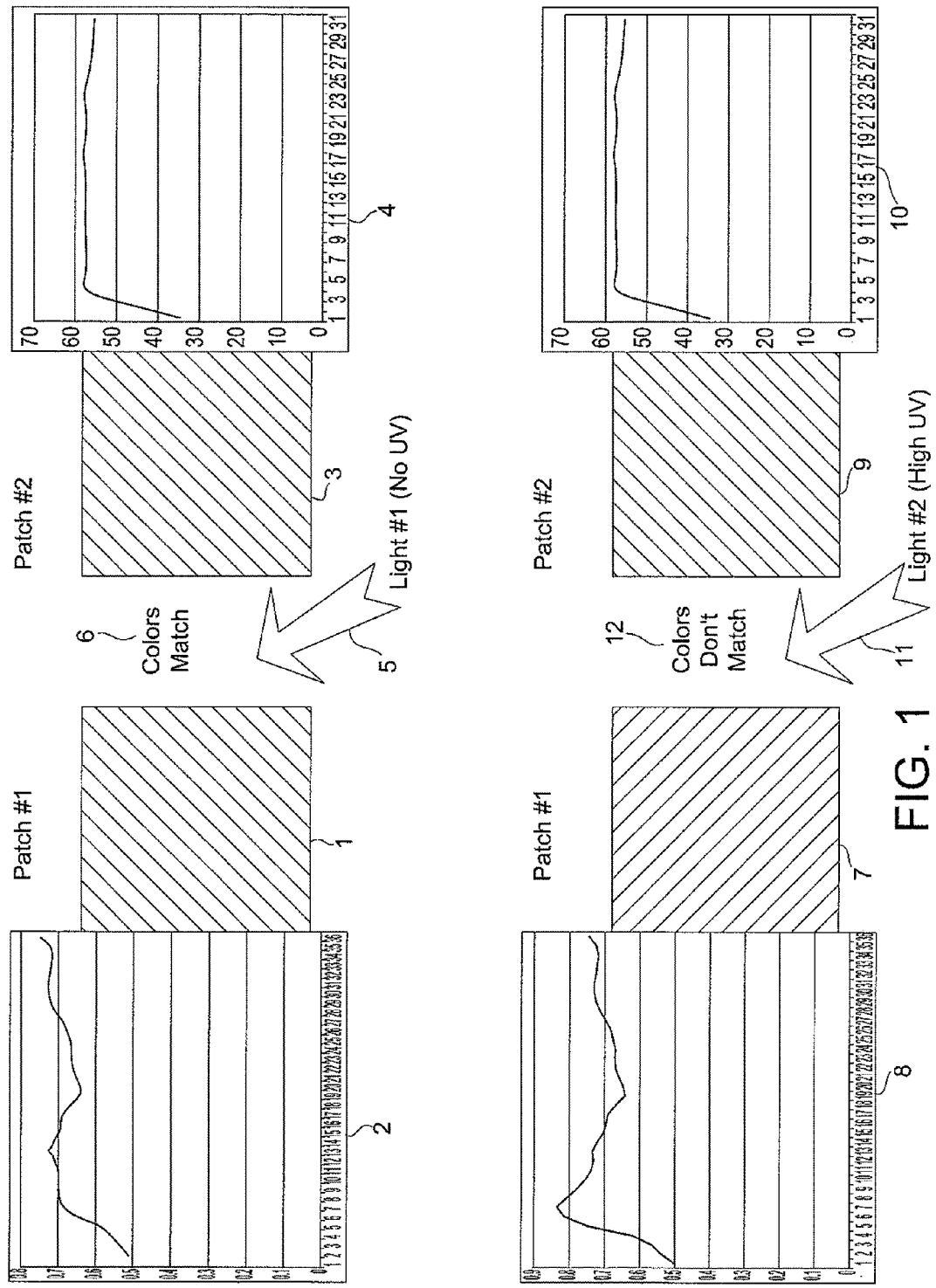
FIG. 1 is a schematic (prior art) illustrating the impact of a light source's UV content on color measurement and color perception according to conventional color measurement techniques.
Figure 2:
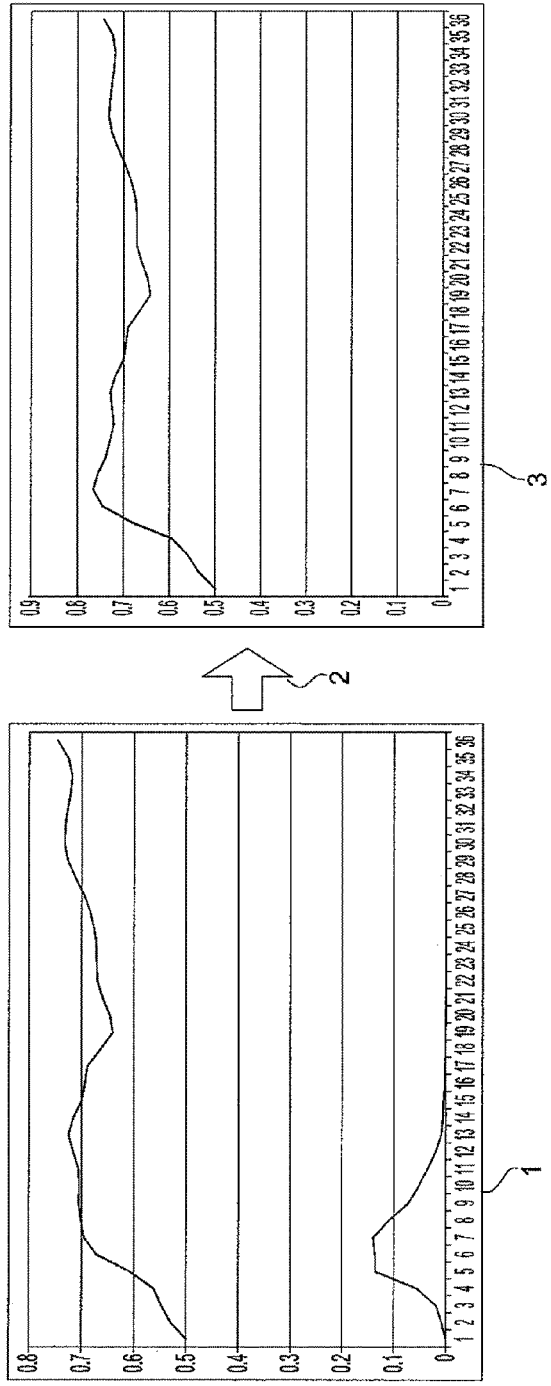
FIG. 2 is a schematic (prior art) illustrating measurement of a sample with different levels of UV to obtain the sample's response to UV light.
Figure 2:
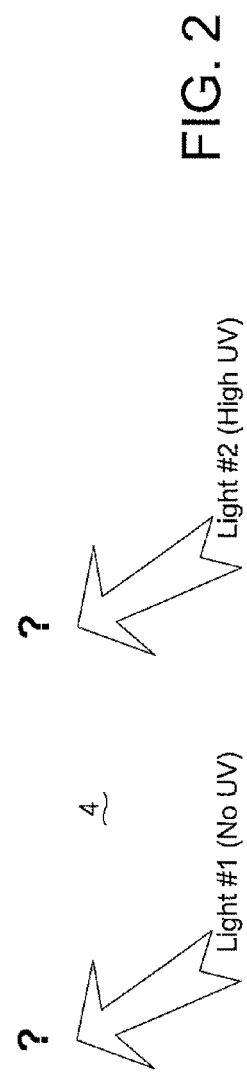
Figure 3:
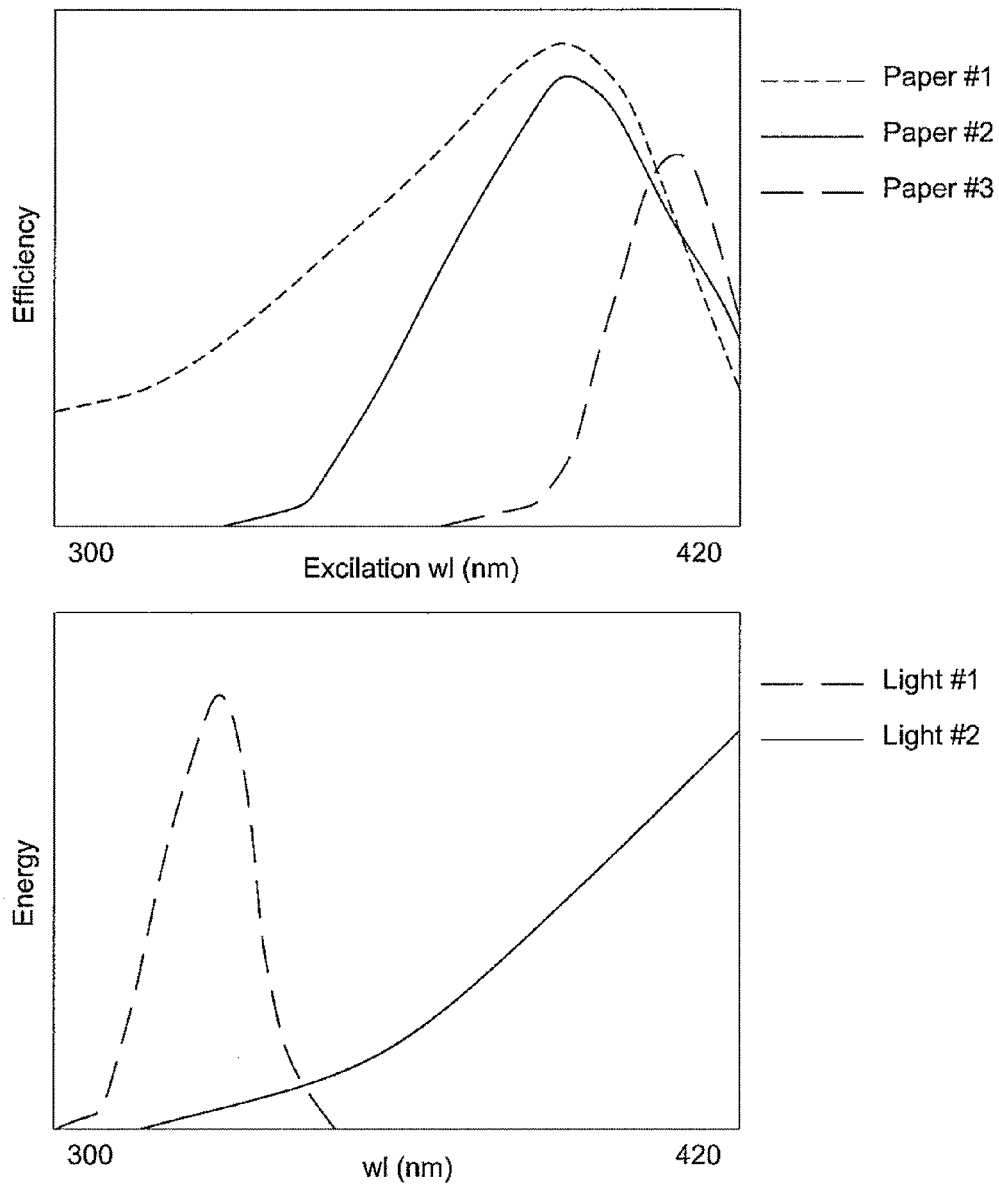
FIG. 3 illustrates the interplay between optical brightener, paper and UV wavelength.
Figure 4:
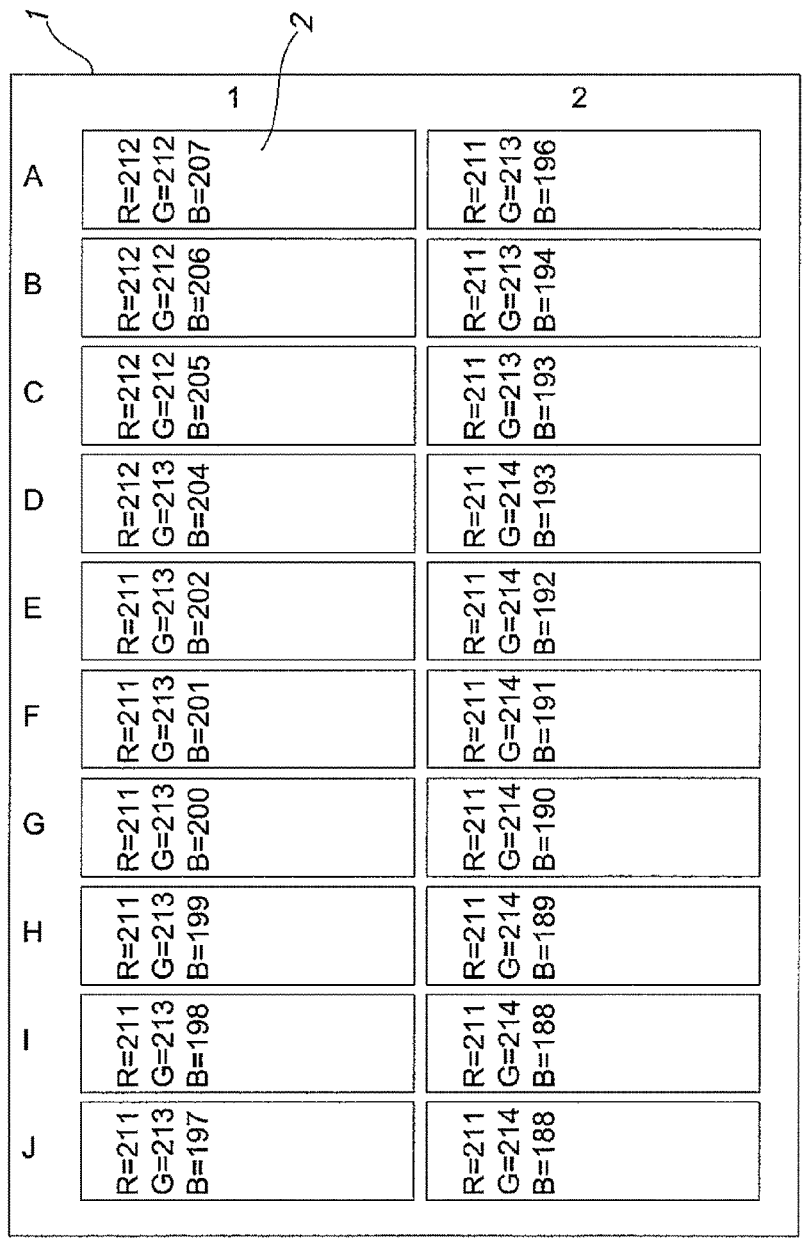
FIG. 4 is a schematic view of an exemplary UV Visualizer Chart that may be used to match a non-fluorescing reference color under different levels of UV illumination.

With initial reference to FIG. 4, an exemplary UV visualizer chart associated with the disclosed systems and methods is provided. The disclosed system/method captures the interaction of the paper and the light source by using a UV visualizer chart and a reference target. Thus, in an exemplary embodiment of the present disclosure, a UV visualizer chart is printed on the paper/substrate that is being characterized and on the device (e.g., printer) that is being characterized. Thus, to the extent the paper contains one or more optical brighteners, the impact of such brighteners is reflected in the UV visualizer chart of FIG. 4.

The UV visualizer chart consists of a set of patches with different colors. Each patch is designed to match a non-fluorescing reference color under a different level of UV light. Thus, for example, exemplary Patch 1A is designed to match a non-fluorescing reference color illuminated with no UV light, whereas exemplary Patch 2J is designed to match a non-fluorescing reference color illuminated with a high level of UV light. The sample data reflected on FIG. 4 is set forth using the RGB color space based on an RGB printer. However, the present disclosure is not limited to RGB color space, as will be readily apparent to persons skilled in the art. Rather, for example, printers that operate in the CMYK color space would generate color patches in the CMYK color space, etc.

As described herein, visual matching of patches associated with the disclosed UV visualizer chart and a reference target allows a user to quickly, reliably and cost-effectively determine how a particular sample (e.g., a printing material) is excited by a particular light.

Figure 5:
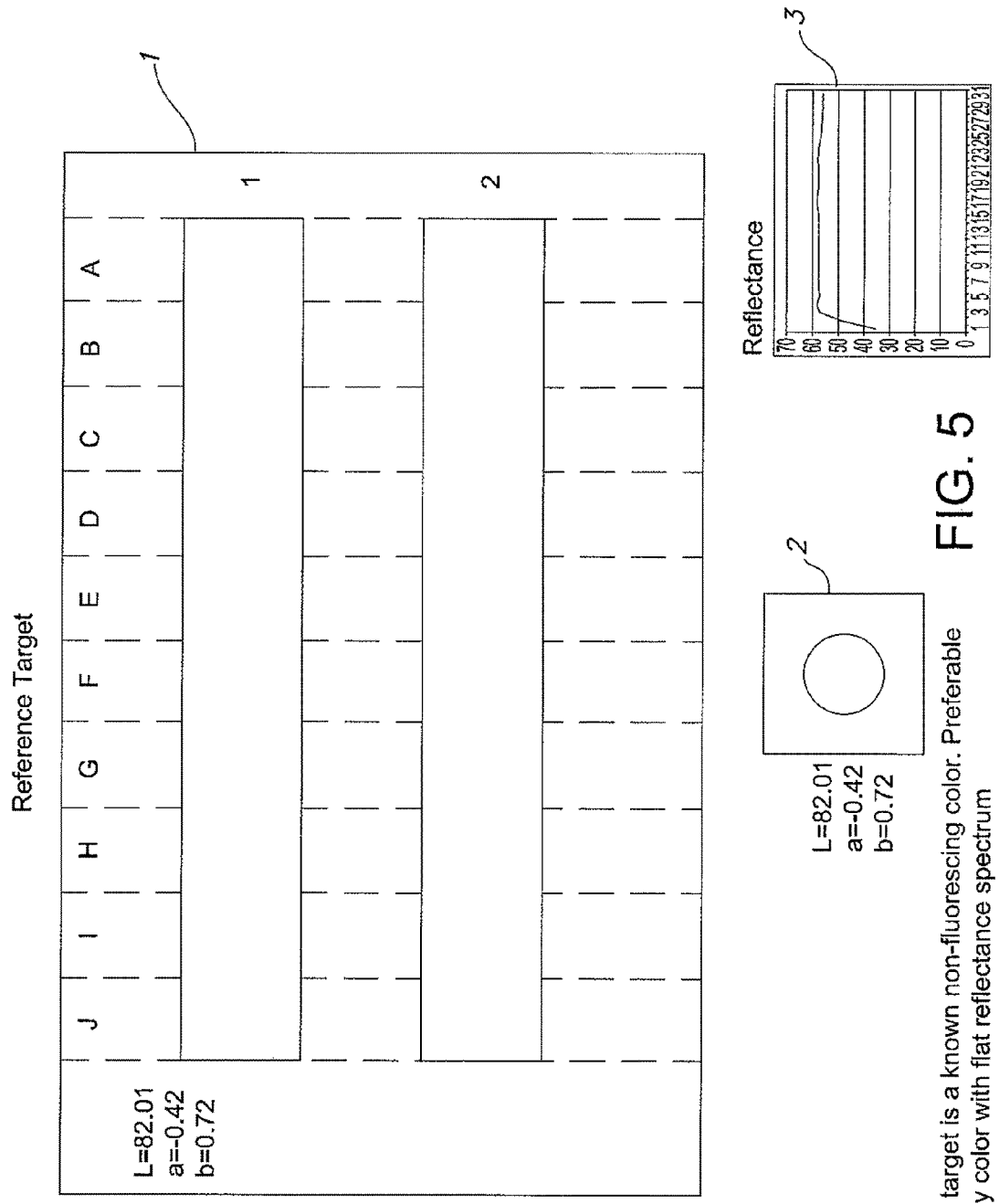
FIG. 5 shows an exemplary reference target according to the present disclosure.

Turning to FIG. 5, a reference target is schematically depicted. The reference target is generated by measuring a material that does not contain fluorescing material and does not fluoresce under UV light. In the exemplary embodiment of FIG. 5, a full page of reference targets are provided to allow all patches associated with the UV visualizer chart to be compared simultaneously. In an alternative implementation, a single patch reference target could be used to compare one patch at a time.

It is generally desirable for the curve of spectra power distribution of a reflectance target to be relatively flat to prevent metamerism. A neutral color for the reference target is typically desirable because humans are sensitive to small variations in neutrals. Similarly, a light color for the reference target is generally desirable because less ink need be applied to the paper to absorb the UV light and the fluorescence. In exemplary embodiments, a light gray color with flat reflectance spectrum may be advantageously employed in generating the reference target.

Figure 6:
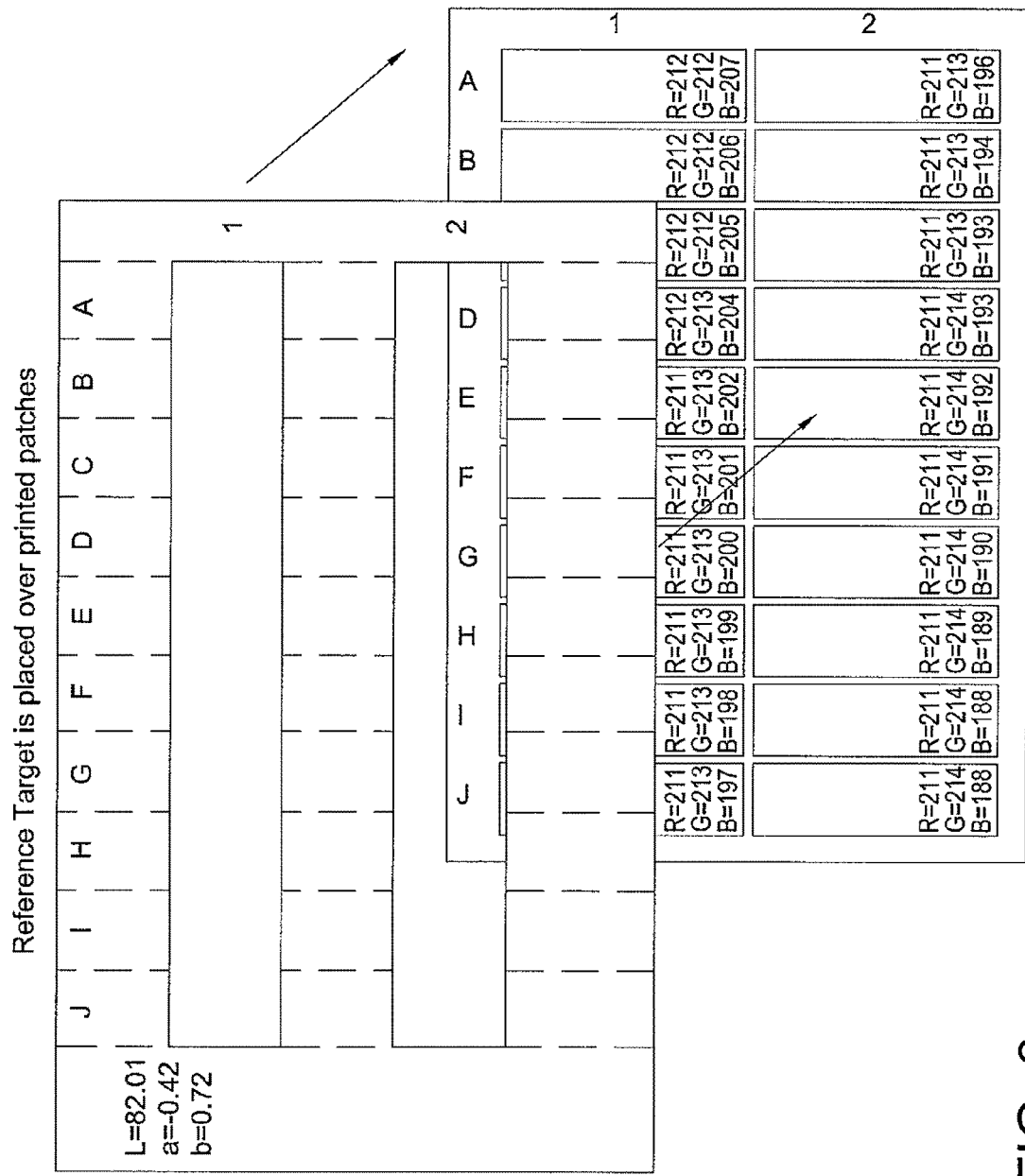
FIGS. 6 and 7 show the reference target of FIG. 5 when placed over the printed patches of the UV Visualizer Chart of FIG. 4.
Figure 7:
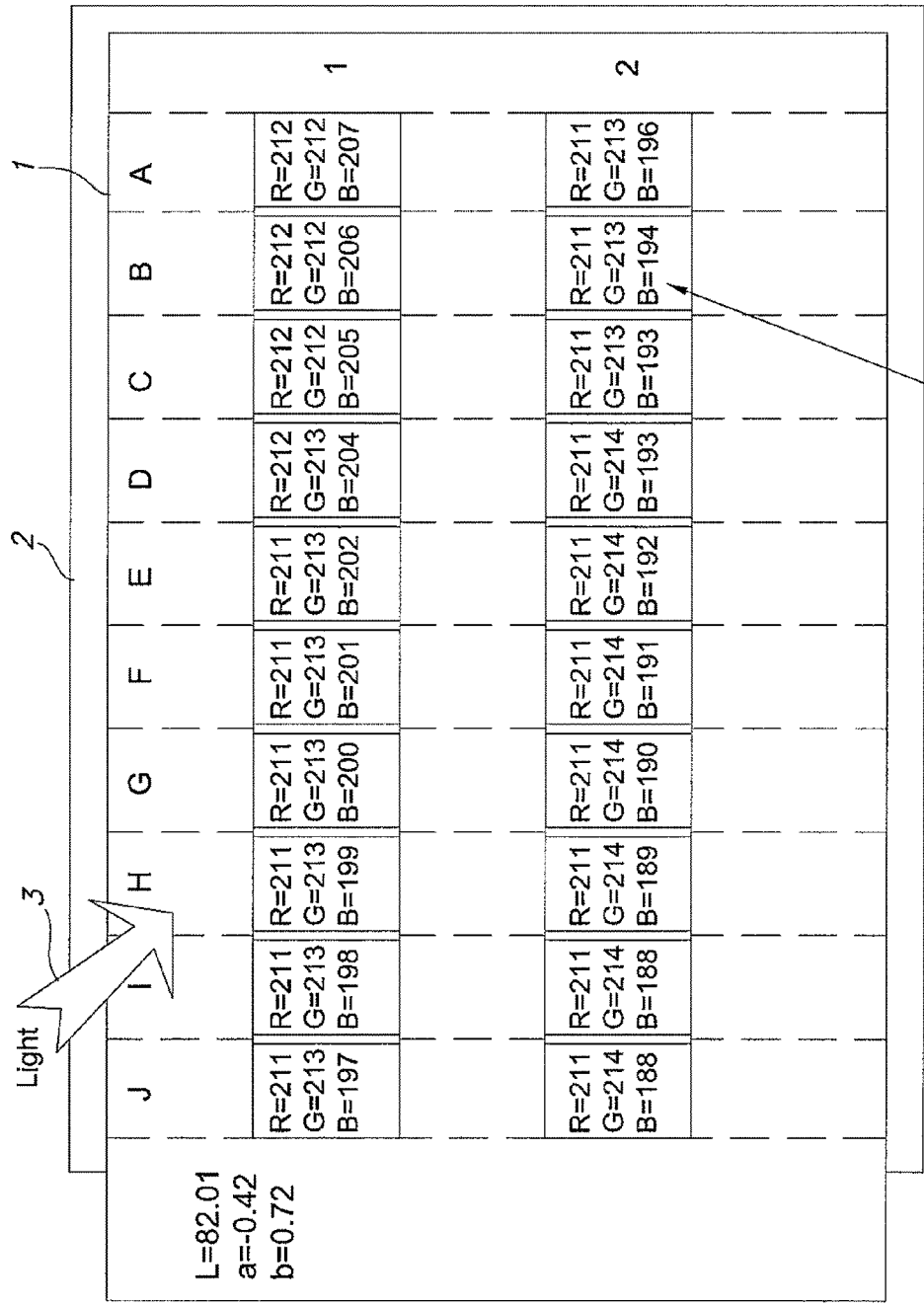

With reference to FIGS. 6 and 7, a technique for positioning the reference target of FIG. 5 relative to the UV visualizer chart of FIG. 4 is shown. The reference target is typically placed on top of the UV visualizer chart. So positioned, a user can readily identify and select the patch on the UV visualizer chart that best matches the patch in the reference target.

More particularly, FIG. 7 illustrates how patches on the UV visualizer chart are matched to the reference target. The reference target and UV visualizer chart—positioned in proximity as illustrated in FIG. 7—are viewed under the light source that is to be characterized for purposes of the sample-of-interest, e.g., the printing material. Based on a selection of the best match (exemplary Patch 2B for purposes of FIG. 7), the user is able to establish/identify the UV content of such light source.

Thus, from a method standpoint, the steps associated with establishing/identifying the UV content of a light source generally include the following:

1. Generating a reference target as shown and described with reference to FIG. 5;
2. Generating a UV visualizer chart as shown and described with reference to FIG. 4;
3. Positioning the reference target and the UV Visualizer Chart in close proximity as shown and described with reference to FIGS. 6 and 7;
4. Illuminating the reference target and UV Visualizer Chart with the light source that is being characterized along with the paper;
5. Identifying the UV visualizer patch that best matches the color of the reference target under the light source-of-interest; and
6. Based on the UV content of the light used to generate the patch that best matches the reference target under the light source-of-interest, establishing/determining the UV content of the light source-of-interest.

Figure 11:
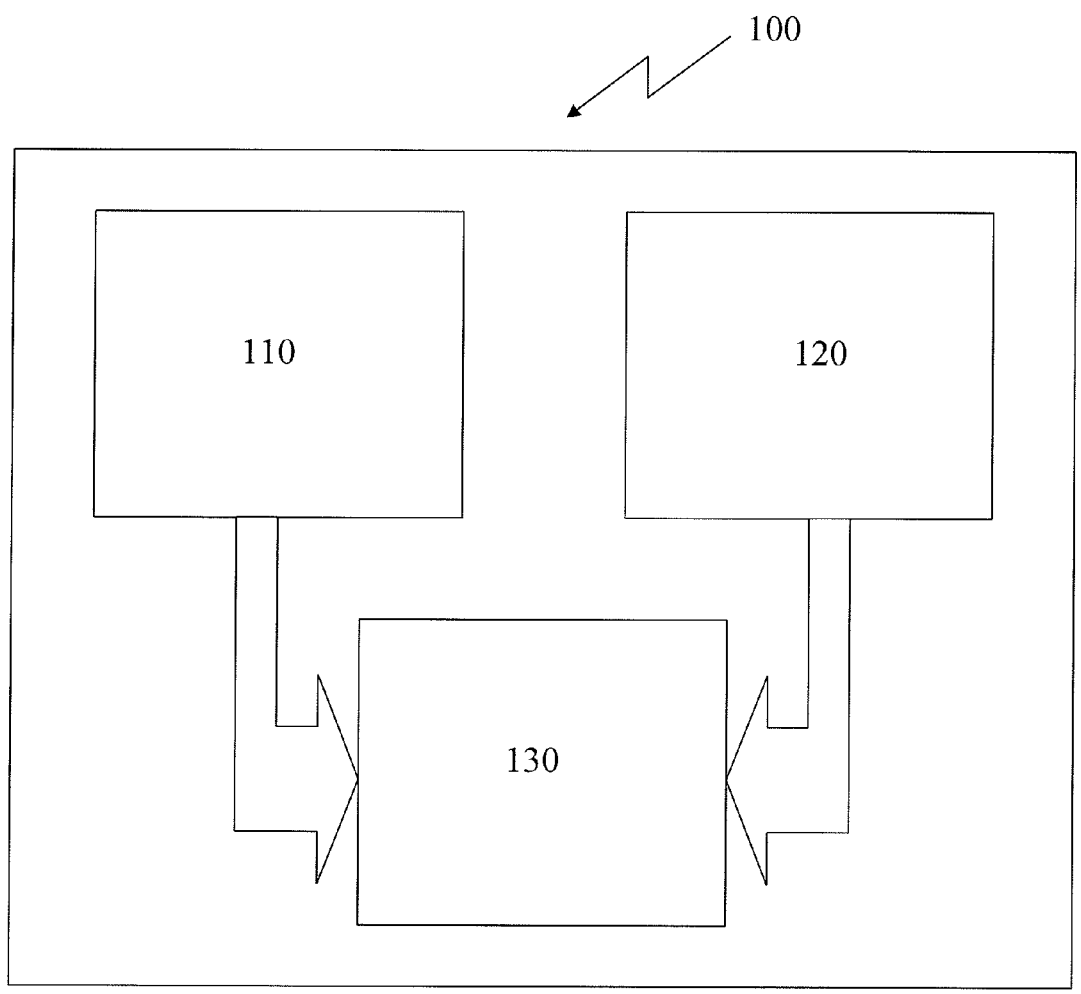
FIG. 11 is a block diagram showing an exemplary system for making a visual color measurement with the assistance of a UV Visualizer chart according to the present disclosure.

Of note, the order in which the reference chart and the UV Visualizer Chart are created is not significant for purposes of the present disclosure. Similarly, the precise number of patches included on the UV Visualizer Chart may vary from implementation-to-implementation, depending on various factors, e.g., the level of precision desired. Referring now to FIG. 11, automated systems, e.g., system 100, may be employed for positioning the reference chart, including reference target 120, and the UV Visualizer Chart 110 in close proximity. Such automated systems may include mechanisms, e.g., mechanism 130, for indexing the reference chart relative to patches on the UV Visualizer Chart (or vice versa).

Figure 8:
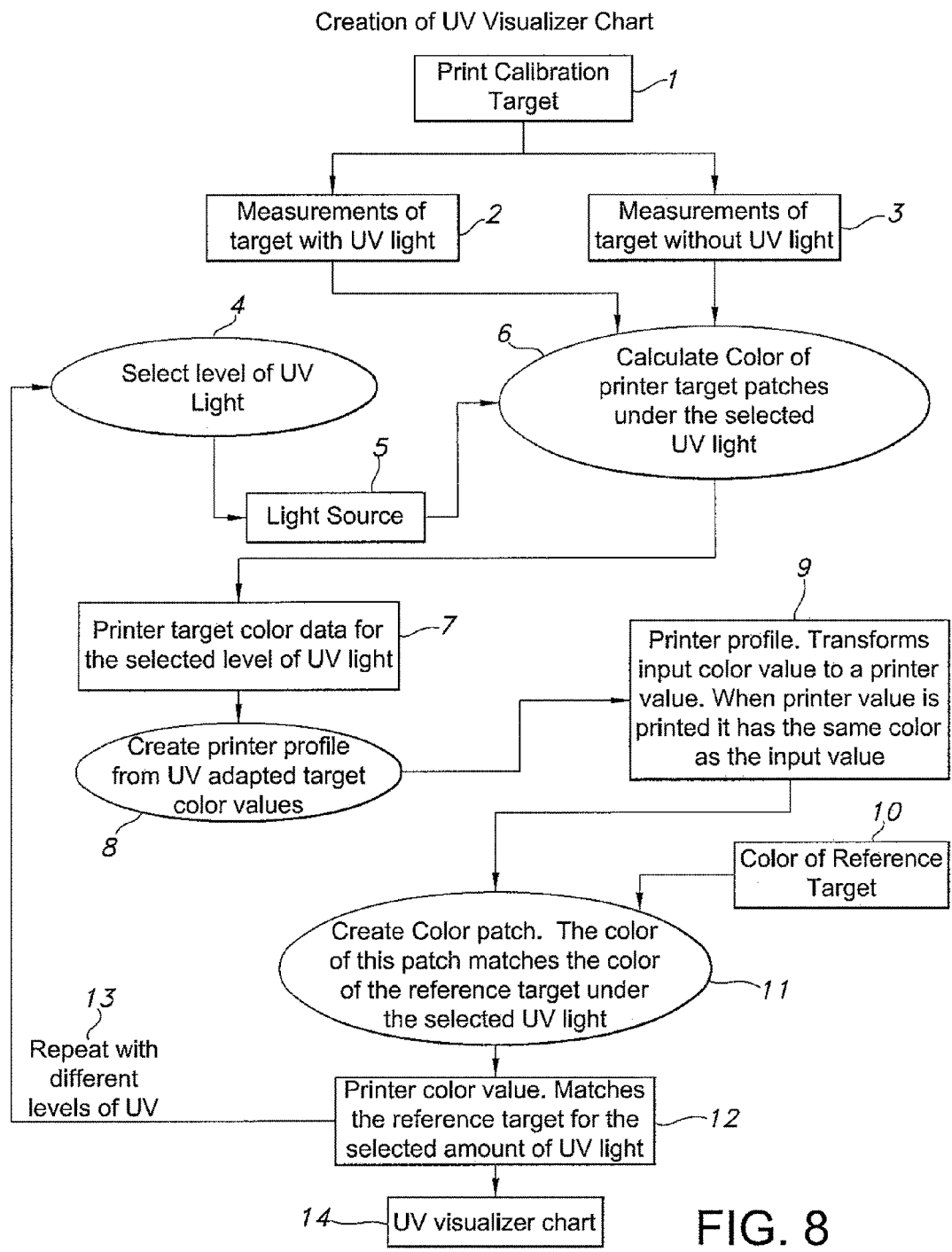
FIG. 8 is a flow chart of an exemplary method/technique for creating a UV Visualizer Chart according to the present disclosure.

FIG. 8 provides an exemplary flowchart setting forth steps associated with creation of a typical UV visualizer chart according to the present disclosure. The color patches generated for the UV visualizer chart according to the steps outlined in the flowchart of FIG. 8 are generated with a light source that includes UV light. In general, the steps include the following (the designation numbers correspond to numbered steps on the flowchart of FIG. 8):

1. The first step is to print out a printer calibration chart. This chart is printed on the paper to be characterized by the printing device that is to be characterized. The printer calibration chart consists of a set of color patches. This set of patches is generally selected so as to be sufficient in variability to permit an accurate color match to the color of the reference target.
2. A set of measurements of the color patches is made with UV light. The measurements can be made either including or excluding visible light.
3. A set of measurements of the color patches is made without UV light.
4. A selection of a level of UV light to match to. The selection amount will typically vary from no UV light to a high UV light level.
5. Establish a virtual light source that contains the selected level of UV light.
6. Calculation of a color on the paper-of-interest for the virtual light source. This calculation may be performed in a manner described by Ehbets et al., e.g., the transforms described in U.S. Patent Publication No. 2007/0086009 A1 of Peter Ehbets et al. The typical optical paper brightener response can be included by using the reflectance values to estimate the amount of UV and fluorescence that is absorbed. The contents of the Ehbets '009 publication are incorporated herein by reference.

Figure 9:
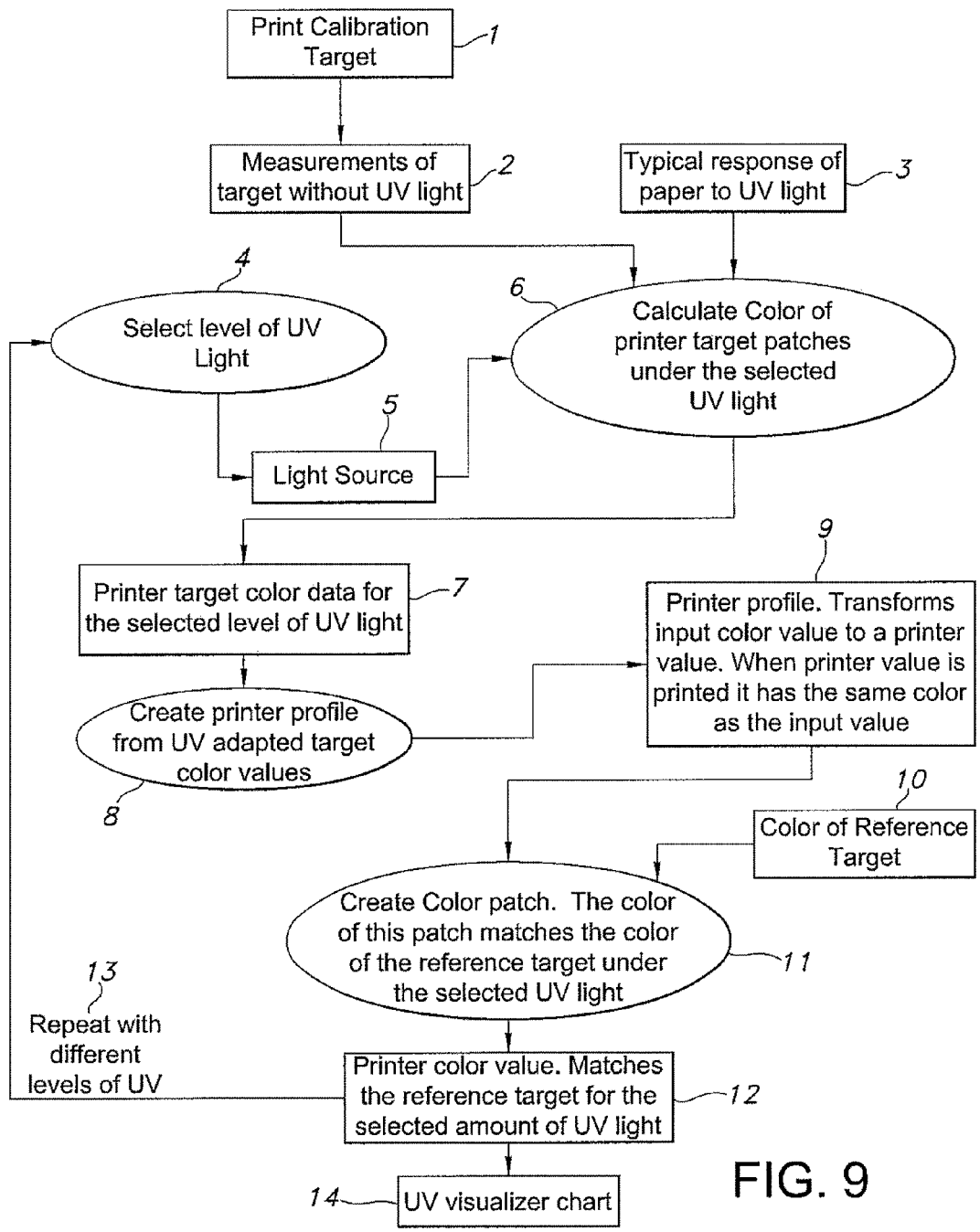
FIG. 9 is a flow chart showing an exemplary method for creating a UV Visualizer Chart with no UV light included in the illuminating light source.

7. Determine measurement values of the printer calibration chart that have been corrected for the selected level of UV light.
8. Creation of a printer profile using the corrected measurement values. This profile can be created in many different ways, as will be apparent to persons skilled in the art, e.g., based on the technical/patent literature setting forth techniques for creating and/or implementing printer profiles. Of note, this profile only needs to be capable of accurately matching the color of the reference target.
9. The printer profile generally takes the form of a transform that is capable of transforming a color value into printer ink values.
10. The color of the reference target can be specified in various ways, e.g., spectrally or calorimetrically.
11. The printer profile is used to transform the color value of the reference target to a printer ink value.
12. The resulting patch printer ink value is established. When printed, this patch generally matches the color of the reference target for the selected level of UV light. It is noted that the interaction of the paper and the light source (as described with reference to FIG. 6) means that the actual visual match may occur at a different level of UV light.
13. Repeat steps 4 through 12 for different levels of UV light.
14. Establish a UV visualizer chart consisting of a set of patches created for the different levels of UV light FIG. 9 provides a variation of the flowchart shown in FIG. 8. This alternative flowchart illustrates the creation of a UV visualizer chart when UV light is not included in the measurements. This method would require less expensive hardware, but would return less accurate results. The process is generally described by the following steps (the designation numbers correspond to numbered steps on the flowchart of FIG. 9):

1. A printer calibration chart is printed. This chart is printed on the paper to be characterized by the printing device to be characterized. It consists of a set of color patches that are generally sufficient in variability to permit an accurate color match to the color of the reference target.
2. A set of measurements of the color patches with UV light is generated. The measurements can be made either including or excluding visible light.
3. A typical optical paper brightener response is generated, such response being typical of many papers that contain optical paper brightener(s).
4. A selection of a level of UV light to match to. The selection amount will typically vary from no UV light to a high UV light level.
5. A virtual light source is established that contains the selected level of UV light.
6. A calculation of a color on the paper for the virtual light source. This calculation may be performed in a manner described by Ehbets et al., e.g., the transforms described in U.S. Patent Publication No. 2007/0086009 A1 of Peter Ehbets et al. The typical optical paper brightener response can be included by using the reflectance values to estimate the amount of UV and fluorescence that is absorbed.
7. Measurement values of the printer calibration chart that have been corrected for the selected level of UV light are established.
8. Creation of a printer profile using the corrected measurement values. This profile can be created in many different ways, as will be readily apparent to persons skilled in the art based, e.g., on the technical and/or patent literature. This profile only needs to be capable of accurately matching the color of the reference target.
9. The printer profile is generally a transform that is capable of transforming a color value into printer ink values.
10. The color of the reference target is specified, e.g., spectrally or calorimetrically.
11. The printer profile is used to transform the color value of the reference target to a printer ink value.
12. The resulting patch printer ink value is determined. When printed, this patch generally matches the color of the reference target for the selected level of UV light. It is noted that the interaction of the paper and the light source as described in FIG. 6 means that the actual visual match may occur at a different level of UV light.
13. Steps 4 through 12 are repeated for different levels of UV light.
14. The UV visualizer chart is established consisting of a set of patches created for the different levels of UV light.

Figure 10:
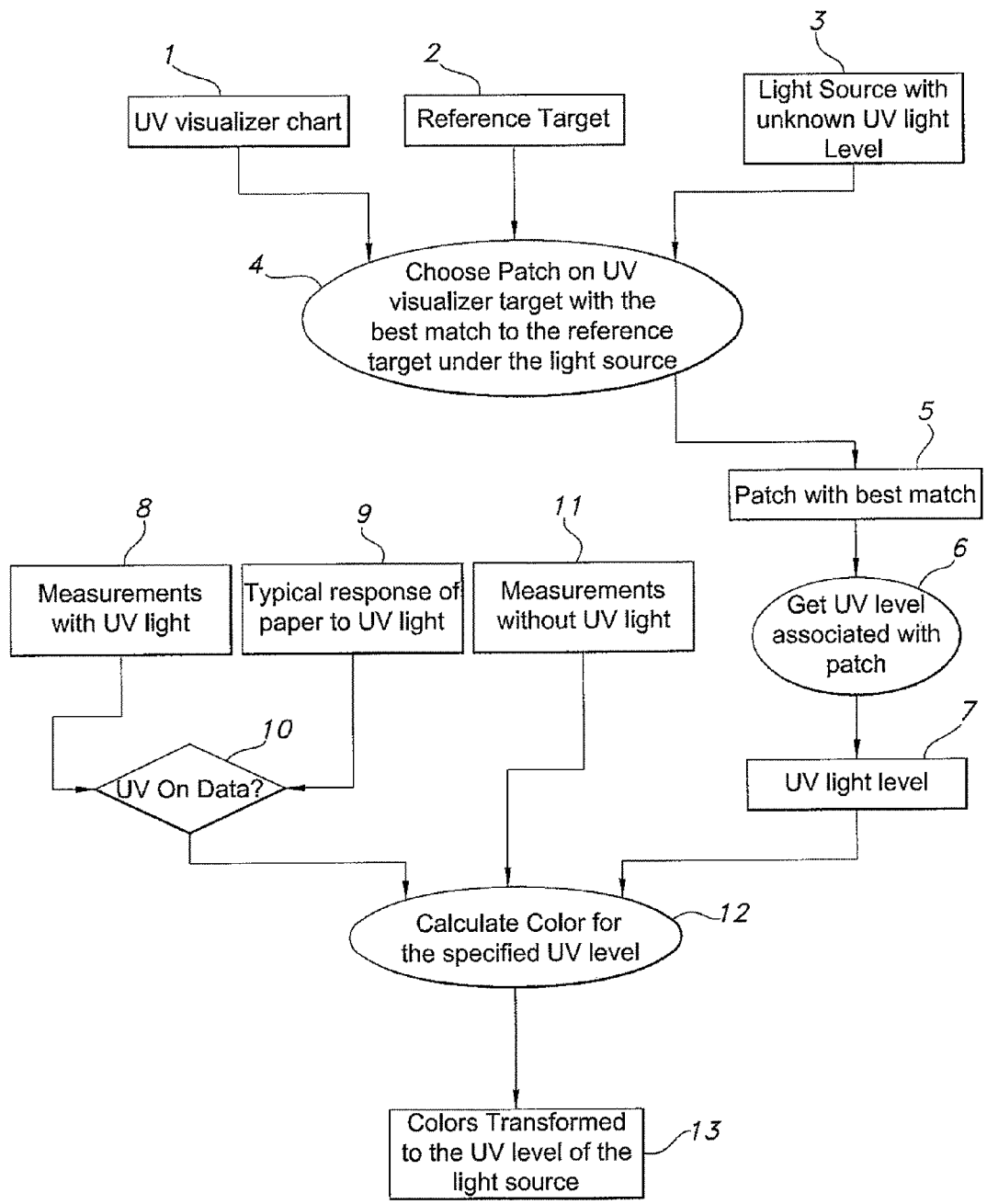
FIG. 10 is a flow chart showing exemplary steps for making a visual color measurement with the assistance of a UV Visualizer chart according to the present disclosure.

FIG. 10 provides a flowchart illustrating the use of the UV visualizer chart of the present disclosure and the reference target to create color measurements that are matched to the light source. The disclosed process may be described in the following steps (the designation numbers correspond to numbered steps on the flowchart of FIG. 10):

1. The UV visualizer chart whose creation is described with reference to the flowcharts of FIGS. 8 and 9 is employed.
2. The reference target described with reference to FIG. 5 is employed.
3. The light source-of-interest, i.e., the light source that will be used to view the sample/paper, is employed.
4. The process where one of the patches on the UV visualizer chart, i.e., the best match, is selected. The reference chart and UV visualizer chart are combined, i.e., placed in close proximity, as described with reference to FIGS. 6 and 7, and viewed under the light source-of-interest. As described herein, one of the patches is selected from the UV visualizer chart based on it being the best visual match to the color of the reference target.
5. The UV patch that is the best match to the reference chart correlates to a specific level of UV light, as described herein.
6. The level of UV light used for the creation of the "best match" patch is determined.
7. The UV light level is determined, which is not necessarily the actual UV light level of the light source-of-interest, but is the UV level of the virtual light source that provides the best match.
8. A set of measurements are made with UV light. These measurements are not needed if UV-included data is not used as described in the flowchart of FIG. 9.
9. Typical optical paper brightener response is determined, such response being needed if measurements were made without UV light.
10. Determine if measurement was made with UV light.
11. Measurements are made without UV light.
12. Create measurements for the specified level of UV light. This is the same calculation as items 6 in the flowcharts of FIGS. 8 and 9.
13. Measurements are made/calculated that have been corrected for how the paper and printed output responds to the light source.

Although the present disclosure has been described with reference to exemplary embodiments and implementations thereof, it is to be understood that the disclosed systems and methods may be modified, altered, enhanced and/or improved without departing from the spirit or scope hereof.

Accordingly, the present disclosure expressly encompasses all such modifications, alterations, enhancements and/or improvements herein.

What is claimed is:

1. A method for enhancing at least one color-related application in varying lighting environments, comprising:
   generating a UV visualizer chart including a plurality of color patches corresponding to different sets of lighting conditions, wherein each color patch matches a same reference color when under the corresponding set of lighting conditions;
   generating a reference target including at least one color patch generated for a known color;
   comparing the plurality of color patches of the UV visualizer chart with the at least one color patch of the reference target under predetermined illumination conditions to identify the best match therebetween; and
   establishing at least one parameter of the predetermined illumination conditions based on the best match.

2. The method of claim 1, wherein the UV visualizer chart is generated by a process that includes the following steps:
   printing a printer calibration chart including color patches on a paper to be characterized using a printing device to be characterized;
   measuring the color patches under illumination conditions that include UV light;
   measuring the color patches under illumination conditions that exclude UV light;
   establishing a virtual light source that contains a selected level of UV light and calculate color values based on the virtual light source;
   determining measurement values for the printer calibration chart that have been corrected for the selected level of UV light;
   creating a printer profile using the corrected measurement values;
   printing color patches using the printer profile that substantially match the color of the reference target for the selected level of UV light;
   repeating steps (a) through (g) for different levels of UV light; and
   establishing a UV visualizer chart that includes a set of patches that are printed based upon the different levels of UV light.

3. The method of claim 1, wherein the reference chart is generated by a process that includes the following steps:
   printing a printer calibration chart including color patches on a paper to be characterized using a printing device to be characterized;
   measuring the color patches under illumination conditions that include UV light;
   selecting a level of UV light for matching purposes;
   establishing a virtual light source that contains the selected level of UV light and calculate a color value based on the virtual light source;
   determining measurement values for the printer calibration chart that have been corrected for the selected level of UV light;
   creating a printer profile using the corrected measurement values; and
   printing the reference target using the printer profile that substantially matches the color of the reference target for the selected level of UV light.

4. The method of claim 1, wherein the UV visualizer chart is generated on a substrate-of-interest or a paper-of-interest.

5. The method of claim 4, further comprising implementing a print-related correction applicable to the substrate-of-interest or the paper-of-interest based on the established at least one parameter of the predetermined illumination conditions.

6. The method of claim 5, wherein the print-related correction necessarily addresses color brightener level, if any, in the substrate-of-interest or the paper-of- interest.

7. The method of claim 1, wherein the reference target includes at least one opening to facilitate comparison of the reference target with the UV visualizer chart.

8. The method of claim 1, wherein the at least one parameter is the UV content associated with the predetermined illumination conditions.

9. The method of claim 1, further comprising using the established parameter of the predetermined illumination conditions to implement a color correction.

10. The method of claim 9, wherein the color correction is effectuated through one or more transforms.

11. The method of claim 1, wherein the plurality of color patches are generated under illumination conditions characterized at least in part by varying levels of UV light.

12. The method of claim 1, wherein the reference target is generated using a non-fluorescing reference.

13. The method of claim 1, wherein the comparison of the UV visualizer chart and the reference target is accomplished manually.

14. The method of claim 1, wherein the comparison of the UV visualizer chart and the reference target is accomplished at least in part based on an automated system.

15. The method of claim 1, further comprising implementing a color transformation by a process that includes the following steps:
   selecting one of the plurality of patches on the UV visualizer chart as a best visual match relative to the reference target under a light source-of-interest;
   correlating the selected patch to a specific level of UV light based on lighting conditions used in generating such selected patch; and
   correcting color measurements based on how the paper and printed output respond to the light source.

16. The method of claim 1, wherein the plurality of patches of the UV visualizer chart are generating in any known color space.

17. The method of claim 1, wherein the at least one parameter of the predetermined illumination conditions is used to correct for viewing conditions of a sample or substrate.

18. A system for enhancing at least one color-related application in varying lighting environments, comprising:
   a UV visualizer chart including a plurality of color patches corresponding to different sets of lighting conditions, wherein each color patch matches a same reference color when under the corresponding set of lighting conditions;
   a reference target including at least one color patch generated for a known color;
   means for positioning the UV visualizer chart and the reference target in close proximity to each other to facilitate (i) comparing the plurality of patches of the UV visualizer chart with the at least one color patch of the reference target under predetermined illumination conditions to identify the best match therebetween;
   and (ii) establishing at least one parameter of the predetermined illumination conditions based on the best match.

* * * * *